A. B. LAMB AND A. T. LARSON.
GAS DETECTOR.
APPLICATION FILED MAR. 4, 1919.
1,416,361.
Patented May 16, 1922.
2 SHEETS—SHEET 1.
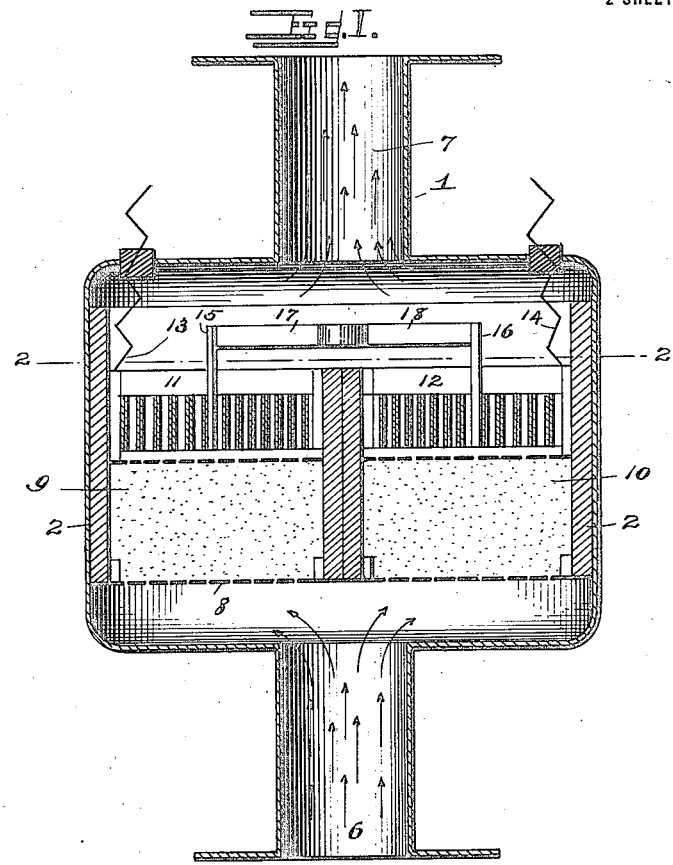
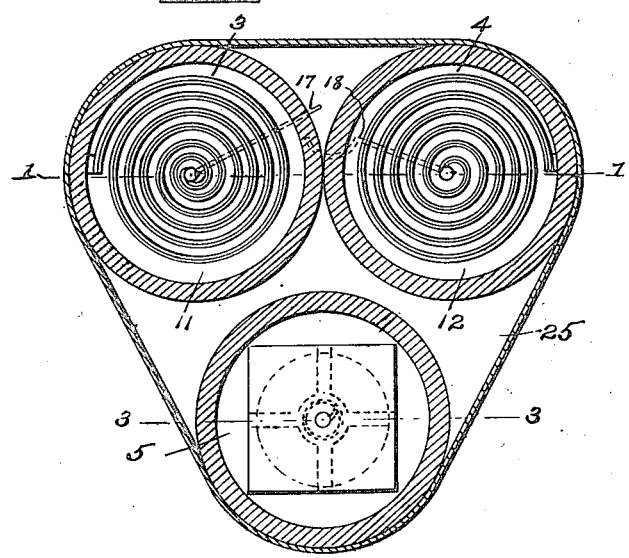
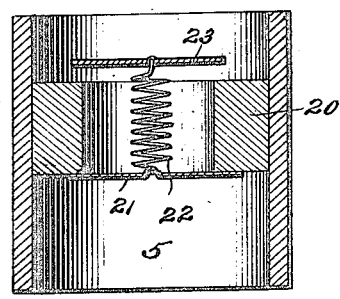
INVENTORS

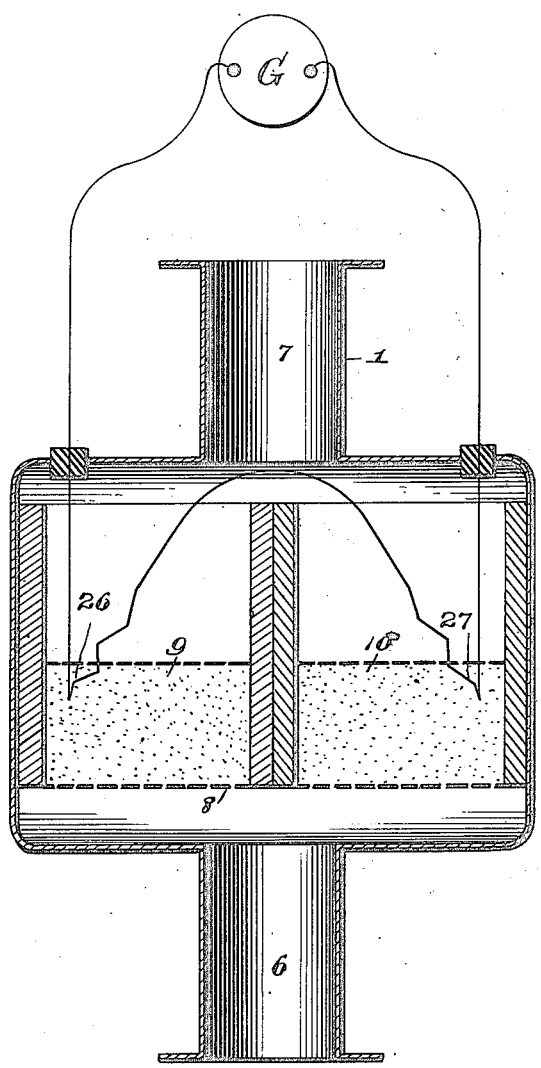

UNITED STATES PATENT OFFICE.

ARTHUR B. LAMB AND ALFRED T. LARSON, OF WASHINGTON, DISTRICT OF COLUMBIA.

GAS DETECTOR.

1,416,361. Specification of Letters Patent. Patented May 16, 1922.

Application filed March 4, 1919. Serial No. 280,577.

*To all whom it may concern:*

Be it known that we, ARTHUR B. LAMB and ALFRED T. LARSON, citizens of the United States, and residing at Washington, D. C., have invented new and useful Improvements in Gas Detectors, of which the following is a specification.

This invention relates to detectors for various gases, particularly combustible gases mixed with air and more specifically to devices of the type wherein a mechanism is actuated by the gas to be detected, closing a circuit and operating an alarm or other signalling device. It is an object of this invention to produce a device which shall be automatic, reliable, easily adjusted in use and not affected by changes in temperature of the surroundings. Our device is capable of a variety of uses especially in connection with gas masks, in mines, around smelters, in enclosed rooms, in flues, etc., to detect poisonous, combustible gases, such as carbon monoxide.

In carrying the object of this invention into effect, we provide a suitable catalyst capable of acting at ordinary or elevated temperatures producing heat by its catalytic effect upon the oxidation of the gas to be detected. The heat so produced may operate an expansible member closing a circuit and giving an alarm as by a bell, light or similar signalling device. We further provide a plurality of metallic members of suitable form, such as a strip or spiral, each of which is preferably formed of two metals having different coefficients of expansion, one of which strips or spirals being acted upon by the heat produced by the action of the catalyst on the gas closes the circuit.

Specifically, we provide strips or spirals so arranged that upon expanding, one moves clockwise and the other counter-clockwise. The inner ends of both metallic members are provided with contact pieces spaced slightly apart, and the outer ends are connected to a circuit containing an alarm. Beneath each of the metallic members is substantially similar material, that under one being catalytically active and under the other inactive. In order to regulate the amount of gas passing through the device, we provide a by-pass valve of simple construction.

In the accompanying drawings which illustrate a specific embodiment of our invention especially adapted for testing air breathed through a respirator or gas mask, Fig. 1 represents a vertical sectional view of the device on line 1—1 of Fig. 2. Fig. 2 shows a horizontal sectional view on line 2—2 of Fig. 1 taken through the metallic members, Fig. 3 is a vertical section of the by-pass valve on line 3—3 of Fig. 2, and Fig. 4 illustrates a modification of the detector.

Casing 1, which is preferably of a triangular section, is divided by cylindrical walls into compartments 3, 4 and 5 and contains an air inlet opening 6 and air outlet 7 for the passage through the casing of air to be tested. The passage 7 is adapted to be connected with the canister of a respirator in order that air to be breathed may first pass through the gas detector in order to determine whether or not poisonous substances are still contained in the air. Across the casing near its lower end is a gauze 8 which closes the lower ends of the compartments 3 and 4 and supports therein layers of catalytic material 9 and 10 in the compartments 3 and 4 respectively. The material in compartment 3 is inactive while that in compartment 4 is active. Directly above the catalytic material 9 and 10 are bi-metallic spirals 11 and 12 respectively, wound in opposite directions but having the metals comprising the spirals similarly arranged. The outer ends of the same are rigidly connected to the walls of their respective compartments and with terminals 13 and 14 respectively, of a source of current. Connected to the inner ends are the upright lead bars 15 and 16 carrying contacts 17 and 18 normally separated by a small space. The lead bars are pivoted on bearings to allow only of rotatory motion.

When the device is used in connection with a gas mask, the inlet 6 is placed in communication with the outlet of the canister, and in order to cut down resistance to the passage of air and to regulate the amount of air flowing through the catalyst, there is provided a by-pass valve 20 in compartment 5 which consists of a light diaphragm 23 attached to a light spring 22 held by a spider 21 to the valve casing.

In operation, part of the air to be tested passing into casing 1 through the inlet 6 is shunted into the compartments 3 and 4 flowing over the active and inactive material. Normally, changes in temperature of the air are transmitted through the walls of the casing to the spirals. By heating both to the same temperature one of the spirals will move clockwise and the other counter-clockwise, keeping the contact pieces 17 and 18 in the same relative position and preventing accidental actuation of the alarm, thus constituting a compensating device for changes in atmospheric temperature. When a combustible gas, for example, carbon monoxide, passes through compartments 3 and 4, the compartment 4 containing active catalytic material will cause combustion of the combustible gas, thus heating the spiral 12 and the consequent expansion of the same will cause its contact piece 18 to engage with contact piece 17, thus closing the circuit and sounding an alarm.

Although we have described a specific embodiment of our invention, we do not intend to limit ourselves to the exact construction shown nor to the dimensions nor relative positions of the various parts and these may be varied at will. The spirals should be of small heat capacity and should be placed close to the source of heat. The heat conductivity of the walls 1 and 2 and the filling material 25 should be small. The depth of the catalyst should be as thin as possible and the spirals should be arranged as open as is convenient to cut down the resistance to the passage of gas.

Various types of catalytic material may be used with this device, but preferably such material as will cause the combustion of the gases to be detected at ordinary temperature, as the mixtures of oxides known as HC which is described and claimed in Patent No. 1,345,323 to Frazer et al. This material is most efficient when used in a dry atmosphere and therefore the incoming air is preferably dried. In place of the electric alarm actuated by the combustion induced by the catalyst a thermometric device, such as a thermo element which will at all times indicate the difference in temperature between the compartments 9 and 10 and so indicate approximately the proportion of combustible gases in the air, may be substituted for the bimetallic spiral arrangement. Fig. 4 shows such a thermometric device consisting of a pair of junctions 26 and 27 imbedded in the catalytic material 9 and 10 and leading to a galvanometer G. The junctions may be of constantan copper. Other arrangements for detecting the difference in temperature between the two compartments, such as differential gas bulb thermo-meters, platinum resistance thermometers, ordinary mercury thermometers, or others, can be used.

Our device is capable of detecting other than combustible gases mixed with air, for instance $CO_2$. In that case the catalyzer as HC is replaced by suitable material which will react with the gas to produce heat.

To increase the sensitiveness of the device we provide means for bringing air to be tested rapidly to the active material. This is accomplished in a variety of ways: (a) creating a natural draft by suitable chimneys, or (b) by accessory heat, causing the air to rise and pass through the catalyst, or (c) by mechanical means, as a fan. Drying the incoming air as by an absorbent, and utilizing a protective absorbent such as charcoal or soda-lime interposed between the catalyst and the entering air to prevent access of harmful or interfering gases, may be resorted to to increase the efficiency of the device.

When it is desired to use a drier, drying material may be placed within the inlet 6 in the path of the entering gases.

The inactive and active material in compartments 9 and 10 respectively constitute an equalizing device to compensate for the rise in temperature produced by the adsorption of air or other gas upon the surface of the porous matter constituting the material.

We claim:

1. A gas detector comprising oppositely arranged expansible members, HC catalyzer placed in proximity to one of said members and means for detecting difference in expansion of said members.

2. A gas detector comprising oppositely arranged expansible members, one end of each being electrically connected to a signalling device and the other ends secured to contact pieces and catalytic means disposed in the path of the gas to be detected before said gas reaches one of said members, said catalytic means serving to hasten the oxidation of the gas to be detected.

3. A gas detector comprising oppositely arranged expansible members, one end of each being electrically connected to a signalling device and the other ends to contact pieces and catalytic means disposed in the path of the gas to be detected before reaching one of said members for oxidizing said gas and heating said member.

4. In a gas detector, a casing, a device arranged in said casing for the detection of gases, a compartment in said casing separate from the detecting device, a by-pass in said compartment through which the gas is passed to the detecting device and means for regulating the amount of gas going through said by-pass and detecting device.

5. A gas detector comprising a casing, inlet and outlet openings in the same, cylindrical members of non-conducting material arranged vertically therein, a gauze closing the lower ends of two of the compartments formed by the said cylinders, inactive material in one and active catalytic material placed in the other, bi-metallic spirals arranged in each of said compartments above said catalytic material, the outer ends of which are rigidly attached to the walls of the cylinders and connected to a source of current, the inner ends of which carry contact pieces normally spaced apart and a by-pass valve within another compartment.

6. A gas detector comprising a casing, a device arranged in said casing for the detection of gases, catalytic material disposed in the path of the incoming air before reaching the detecting device and a protective absorbent disposed in the path of the incoming air before reaching the catalyst.

7. Means for detecting gases comprising a casing, a compartment within said casing containing active material, means for bringing gases to be detected into contact with said material, and a differential thermometric device placed in proximity to but separated from said material.

8. Means for detecting gases comprising a casing, a plurality of compartments within the same, active material within one of said compartments, inactive material within another of said compartments, means for bringing gases to be detected into contact with said material, and a differential thermometric device placed in proximity to but separated from the material in said compartments to indicate the difference in temperature in said compartments.

9. In a gas detector, a pair of similar expansible members disposed in separate compartments of the detector, catalytic material disposed near one of said members but out of immediate contact therewith and means for bringing the gas to be detected in contact with the catalytic material before reaching said member.

10. In a gas detector, a pair of similar, oppositely arranged, expansible members, conduits for bringing the gas to be detected in contact with said members and catalytic means disposed within one of said conduits in close proximity to but out of immediate contact with one of said members and in the path of the gas to be detected before reaching said member.

ARTHUR B. LAMB.
ALFRED T. LARSON.